(12) United States Patent
Kawanami

(10) Patent No.: US 8,212,907 B2
(45) Date of Patent: Jul. 3, 2012

(54) IMAGING-DEVICE DRIVING UNIT AND IMAGING APPARATUS FOR DRIVING AN IMAGE PICKUP DEVICE IN ACCORDANCE WITH REMAINING BATTERY POWER

(75) Inventor: Naoto Kawanami, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 428 days.

(21) Appl. No.: 12/546,931

(22) Filed: Aug. 25, 2009

(65) Prior Publication Data
US 2010/0066885 A1    Mar. 18, 2010

(30) Foreign Application Priority Data
Sep. 16, 2008   (JP) ................................ 2008-236855

(51) Int. Cl.
H04N 3/14 (2006.01)
H04N 5/335 (2011.01)

(52) U.S. Cl. ......... 348/311; 348/303; 348/304; 348/314

(58) Field of Classification Search .................. 348/311, 348/333.13
See application file for complete search history.

(56) References Cited

U.S. PATENT DOCUMENTS

| | | | | |
|---|---|---|---|---|
| 6,735,455 B2* | 5/2004 | Naito et al. | ................... | 455/574 |
| 6,778,215 B1* | 8/2004 | Nakashima et al. | .......... | 348/314 |
| 7,102,685 B2* | 9/2006 | Nishimura | .................... | 348/372 |
| 7,391,455 B2* | 6/2008 | Oda | .............................. | 348/314 |
| 7,483,073 B2* | 1/2009 | Takai | ............................ | 348/372 |
| 7,542,083 B2* | 6/2009 | Kubo | ........................... | 348/248 |
| 8,111,313 B2* | 2/2012 | Kawanami | .................... | 348/312 |
| 8,134,629 B2* | 3/2012 | Kawanami | .................... | 348/312 |
| 2002/0126214 A1* | 9/2002 | Kijima et al. | ................. | 348/296 |
| 2009/0149705 A1 | 6/2009 | Tani et al. | | |
| 2009/0231709 A1 | 9/2009 | Nomura et al. | | |

FOREIGN PATENT DOCUMENTS
JP    4-356879    12/1992

OTHER PUBLICATIONS
English language Abstract of JP 4-356879, Dec. 10, 1992.
U.S. Appl. No. 12/558,644 to Kawanami, filed Sep. 14, 2009.
U.S. Appl. No. 12/571,697 to Kawanami, filed Oct. 1, 2009.

* cited by examiner

Primary Examiner — Nicholas Giles
Assistant Examiner — Cynthia Segura
(74) Attorney, Agent, or Firm — Greenblum & Bernstein, P.L.C.

(57) ABSTRACT

A imaging-device driving unit, comprising a signal generator, a detector, and a controller, is provided. The imaging-device driving unit drives an imaging device that has a charge-transfer channel. The charge-transfer channel transfers the signal charges at a speed according to a frequency of a channel-driving signal. The signal generator generates one among a normal transfer signal, and a first and second discharge signals. The first discharge signal is the channel-driving signal whose frequency is determined for discharging an electrical charge remaining in the charge-transfer channel and greater than that of the normal transfer signal. The detector detects a remaining power. The controller orders the signal generator to generate the first discharge signal if the electrical charges remaining in the charge-transfer channel should be discharged and the remaining power is less than a threshold.

12 Claims, 5 Drawing Sheets

IMAGING-DEVICE DRIVING UNIT AND IMAGING APPARATUS FOR DRIVING AN IMAGE PICKUP DEVICE IN ACCORDANCE WITH REMAINING BATTERY POWER

BACKGROUND OF THE INVENTION

1. Field of the Invention

The present invention relates to an imaging-device driving unit that orders an imaging device to speedily discharge an unnecessary electrical charge generated by a charge-transfer channel, such as a CCD, before a photographing operation.

2. Description of the Related Art

Various kinds of imaging devices which generate an image signal corresponding to an optical image of a subject are known. Among the various kinds of imaging devices, a CCD imaging device which is improved with respect to size, S/N ratio, sensitivity, and aspects is broadly used.

A CCD imaging device outputs pixel signals according to the amount of light received by the pixels, by ordering a vertical CCD to receive signal charges generated by a plurality of pixels separately, and ordering the vertical CCD to transfer the signal charges to a horizontal CCD, and also ordering the horizontal CCD to transfer the signal charges to an output amplifier.

The vertical CCD happens to store an electrical charge generated by the vertical CCD itself based on light leaked to the vertical CCD, and from an electrical charge left upon transferring an electrical charge exceeding the transferring capacity, from an electrical charge leaked from a pixel, and so on. Such an electrical charge become noise in a signal charge, and should be discharged to display an accurate image.

Japanese Unexamined Patent Publication No. H04-356879 discloses the speedy discharge of an electrical charge remaining in the vertical CCD before the vertical CCD receives signal charges from pixels and transfers them.

On the other hand, the frequency of a driving signal used to drive the vertical CCD should be raised in order for the vertical CCD to speedily discharge. However, power consumption increases with the rise in frequency, reducing the power available for photographing operations, and possibly resulting in the suspension of the photographing operation.

SUMMARY OF THE INVENTION

Therefore, an object of the present invention is to provide an imaging-device driving unit that discharges the electrical charge remaining in a charge-transfer channel with and thus reduces the possibility of the suspension of a photographing operation in a charge-transfer imaging device, such as a CCD imaging device.

According to the present invention, an imaging-device driving unit, comprising a signal generator, a detector, and a controller, is provided. The imaging-device driving unit drives an imaging device that has a plurality of pixels and a charge-transfer channel. The pixels generate signal charges according to amounts of received light. The charge-transfer channel reads out the signal charges from the pixels and transfers the signal charges at a speed according to a frequency of a channel-driving signal. The signal generator generates and transfers one among a normal transfer signal, and a first and second discharge signals to the imaging device. The normal transfer signal is the channel-driving signal whose frequency is determined for transferring the signal charges. The first discharge signal is the channel-driving signal whose frequency is determined for discharging an electrical charge remaining in the charge-transfer channel and greater than that of the normal transfer signal. The second discharge signal is the channel-driving signal whose frequency is determined for discharging an electrical charge remaining in the charger transfer channel and which is greater than that of the first discharge signal. The detector detects a remaining power. The remaining power is the power remaining in a battery. The battery supplies the power to drive the imaging device. The controller orders the signal generator to generate the first discharge signal if the electrical charges remaining in the charge-transfer channel should be discharged and the remaining power is less than a threshold.

Further, the controller orders the signal generator to generate the second discharge signal if the electrical charges remaining in the charge-transfer channel should be discharged and the imaging device is ordered to carry out continuous photographing.

According to the present invention, an imaging apparatus, comprising an imaging device, a signal generator, a detector, and a controller, is provided. The imaging device has a plurality of pixels and a charge-transfer channel. The pixels generate signal charges according to amounts of received light. The charge-transfer channel reads out the signal charges from the pixels and transfers the signal charges at a speed according to a frequency of a channel-driving signal. The signal generator generates and transfers one among a normal transfer signal, and a first and second discharge signals to the imaging device. The normal transfer signal is the channel-driving signal whose frequency is determined for transferring the signal charges. The first discharge signal is the channel-driving signal whose frequency is determined for discharging an electrical charge remaining in the charge-transfer channel and greater than that of the normal transfer signal. The second discharge signal is the channel-driving signal whose frequency is determined for discharging an electrical charge remaining in the charger transfer channel and which is greater than that of the first discharge signal. The detector detects a remaining power. The remaining power is the power remaining in a battery. The battery supplies the power to drive the imaging device. The controller orders the signal generator to generate the first discharge signal if the electrical charges remaining in the charge-transfer channel should be discharged and the remaining power is less than a threshold.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

The present invention is described below with reference to the embodiment shown in the drawings.

Figure 1:
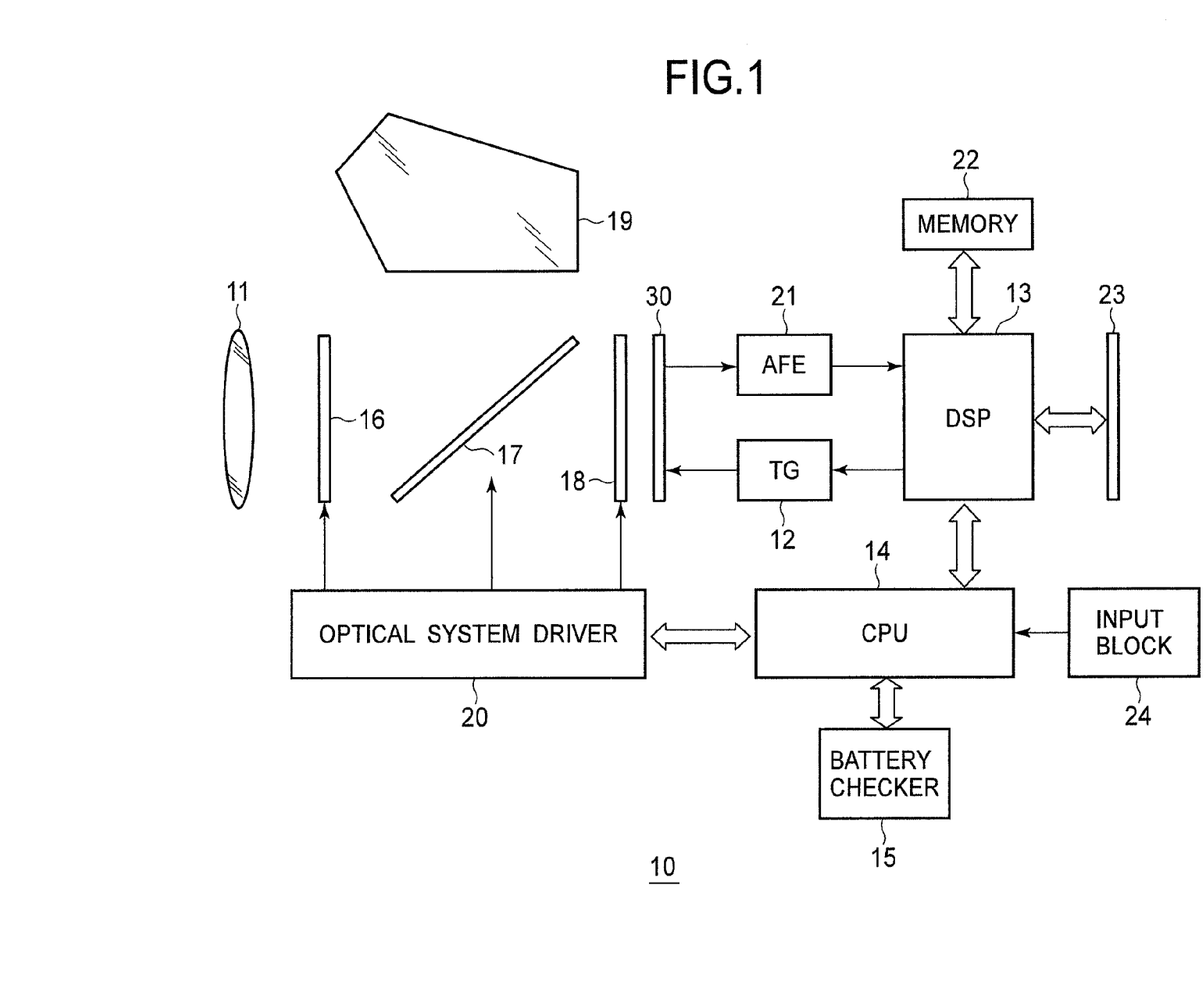
FIG. 1 is a block diagram showing the internal structure of a single-lens reflex camera having the imaging-device driving unit of the embodiments of the present invention.

In FIG. 1, the single-lens reflex camera 10 comprises a photographic optical system 11, an imaging device 30, a timing generator (TG) 12 (signal generator), a digital signal processor (DSP) 13, a CPU 14, a battery checker 15 (detector), and other components.

The photographic optical system 11 comprises a plurality of lenses, including a focus lens (not depicted) and a zoom lens (not depicted). The imaging device 30 is arranged on the optical axis of the photographic optical system 11 so that the light-receiving surface of the imaging device 30 is perpendicular to the optical axis. The photographic optical system 11 enables an optical image of a subject to be in focus on the light-receiving surface.

A diaphragm 16, a mirror 17, and a shutter 18 are between the photographic optical system 11 and the imaging device 30. By varying the size of the aperture of the diaphragm 16, the amount of light incident on the imaging device 30 may be adjusted. In ready mode for photographing, the mirror 17 is kept in the optical axis, and an optical image is reflected by the mirror 17 to a pentaprism 19 and transmitted to a viewfinder (not depicted). Upon a release operation, the mirror 17 is turned upward, and the optical image arrives at the shutter 18. By opening and closing the shutter, light arriving at the imaging device 30 may be controlled.

The diaphragm 16, the mirror 17, and the shutter 18 are driven by the optical system driver 20. The optical system driver 20 drives each of the components on the basis of the control of the CPU 14.

The TG 12 drives the imaging device 30 to generate an image signal corresponding to the optical image reaching the light-receiving surface. The TG 12 is controlled by the DSP 13. The generated image signal is transmitted to the DSP 13 via an AFE 21.

The AFE 21 carries out correlated double sampling processing, auto gain control processing, and analog-to-digital conversion processing on the received image signal. The DSP 13 carries out predetermined signal processing on the received image signal. The image signal, having undergone predetermined signal processing, is stored in a memory 22, or transmitted to an LCD 23, where a captured image is displayed.

The DSP is connected to the CPU 14. The DSP 13 carries out the drive of the TG 12, predetermined signal processing on the image signal, the storage of the image signal in the memory 22, and other operations on the basis of orders from the CPU 14.

As described above, the CPU 14 controls the optical system driver 20 and the DSP 13. In addition, the CPU 14 orders the battery checker 15 to detect a voltage of a battery (not depicted) that supplies power to components of the single-lens reflex camera 10. As explained later, the CPU 14 controls the driving of the imaging device 20 by the TG 12 according to the voltage of the battery.

Furthermore, the CPU 14 controls operations of each component of the single-lens reflex camera 10. The CPU 14 is connected to an input block 24 which comprises a release button (not depicted), a power button (not depicted), a multifunctional cross key (not depicted), and so on. The CPU 14 controls the components according to various commands input by a user to the input block 24.

Next, the operation of the imaging device 30 upon the release operation, and the structure of the imaging device 30 are explained.

Figure 2:
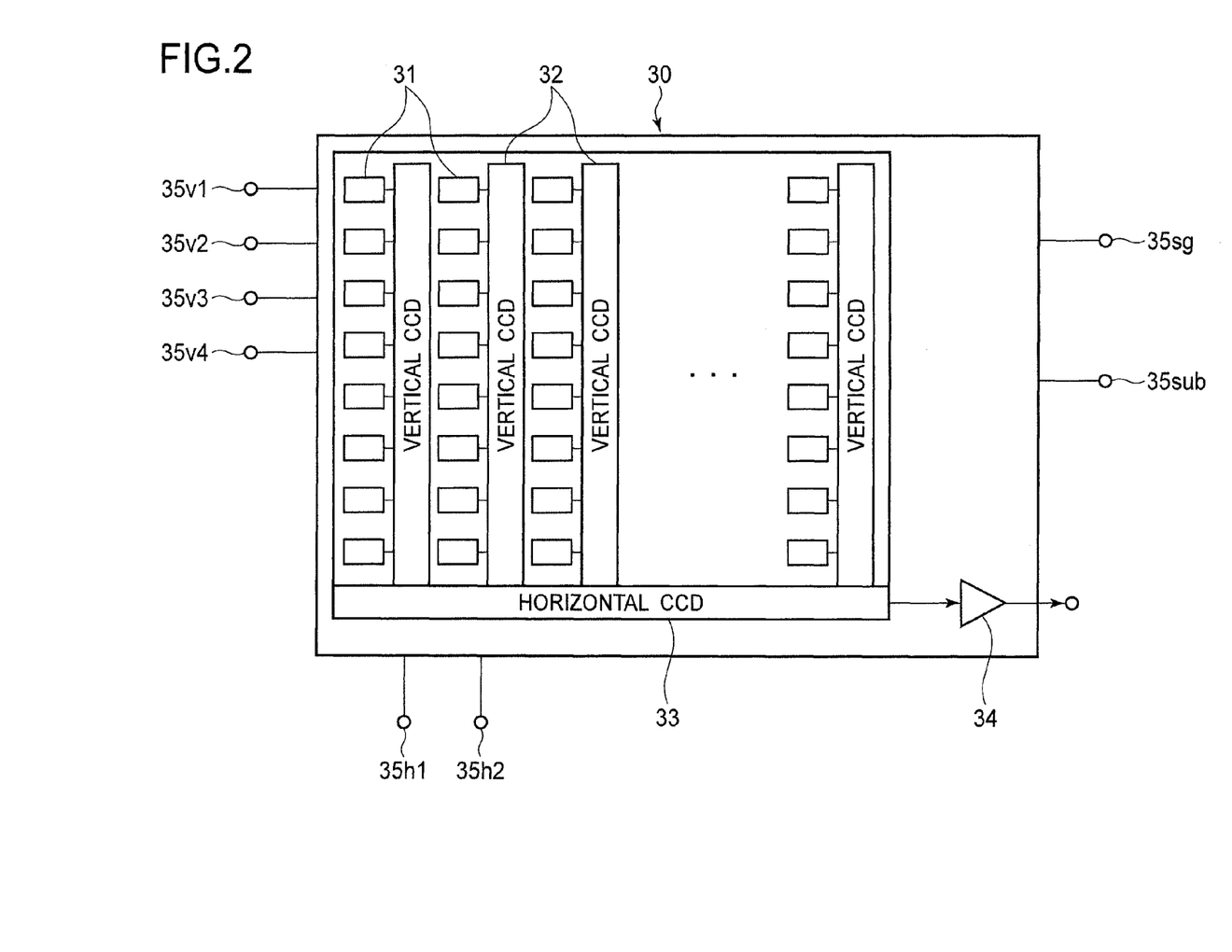
FIG. 2 is a schematic diagram showing the structure of the imaging device.

The imaging device 30 is a CCD imaging device. As shown in FIG. 2, the imaging device 30 comprises pixels 31, vertical CCDs 32, a horizontal CCD 33, an output amplifier 34, and other components.

A plurality of pixels 31 are arranged on the light-receiving surface in two dimensions. The vertical CCDs 32 are arranged in each column of the arranged pixels 31. All the pixels 31 are connected to the adjacent vertical CCD 32. The horizontal CCD 33 is arranged at the bottom of the vertical CCDs 32. All the vertical CCDs 32 are connected to the horizontal CCD 33. One end of the horizontal CCD 33 is connected to the output amplifier 34.

Each pixel 31 generates and accumulates a signal charge corresponding to the amount of light received. A substrate (not depicted) where the pixels 31 are arranged is connected to an electronic shutter terminal 35sub. When an electronic shutter pulse, (hereinafter referred to as ΦSUB), is input to the electronic shutter terminal 35sub, an accumulated electrical charge is discharged from all the pixels 31. In addition, a sensor gate (not depicted) is arranged between the pixel 31 and the vertical CCDs 32. The sensor gate comprises a sensor gate terminal 35sg, (hereinafter referred to as the SG terminal). When an SG pulse, (hereinafter referred to as ΦSG), is input to the SG terminal 35sg, the accumulated signal charge in each pixel is output to the vertical CCDs 32.

Figure 3:
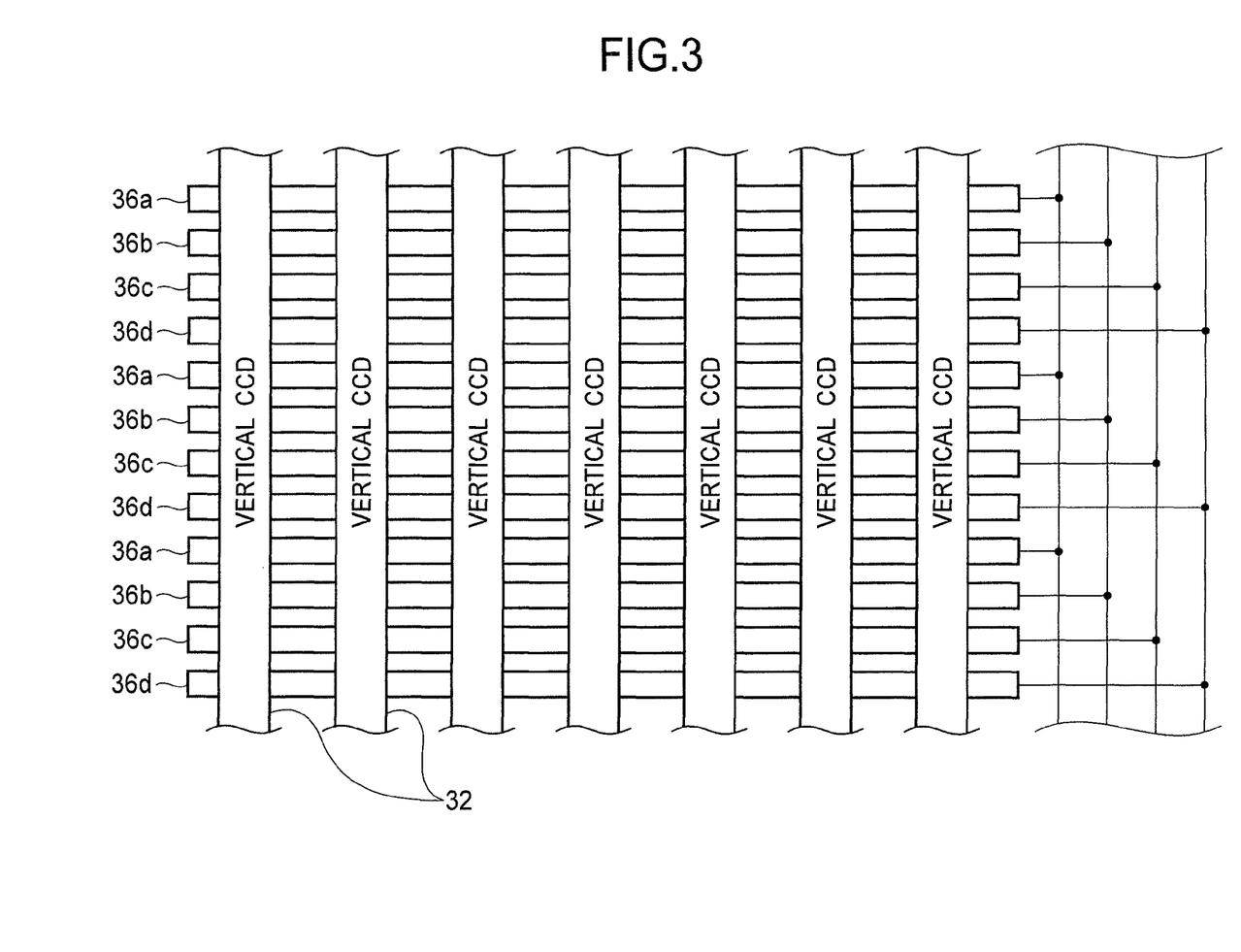
FIG. 3 is a deployment diagram showing the first to fourth electrodes.

As shown in FIG. 3, first, second, third, and fourth electrodes 36a, 36b, 36c, and 36d are arranged repeatedly in order along the column direction of the vertical CCDs 32. In addition, the first, second, third, and fourth electrodes 36a, 36b, 36c, and 36d are connected to first, second, third, and fourth vertical transfer terminals 35v1, 35v2, 35v3, and 35v4 (see FIG. 2), respectively.

By inputting vertical transfer pulses (channel-driving signals), (hereinafter referred to as ΦV) to the first to fourth electrodes 36a-36d while shifting their phases, the electrical charge stored in the vertical CCDs 32 is transferred to the horizontal CCD 33. The speed at which the vertical CCDs 32 transfer an electrical charge varies in proportion to the frequency of the ΦV.

Fifth and sixth electrodes (not depicted) are arranged repeatedly in order along the row direction of the horizontal CCD 33. In addition, the fifth and sixth electrodes are connected to first and second horizontal transfer terminals 35h1 and 35h2 (see FIG. 2), respectively. By inputting horizontal transfer pulses, (hereinafter referred to as ΦH), to the fifth and sixth electrodes while shifting their phase, the electronic charge received by the horizontal CCD 33 is transferred to the output amplifier 34.

ΦSUB, ΦSG, ΦV, and ΦH are generated by the TG 12 and input to the respective terminals.

The output amplifier 34 comprises a capacitor (not depicted), which converts a received signal charge into a signal voltage, and outputs the converted signal voltage.

Figure 4:
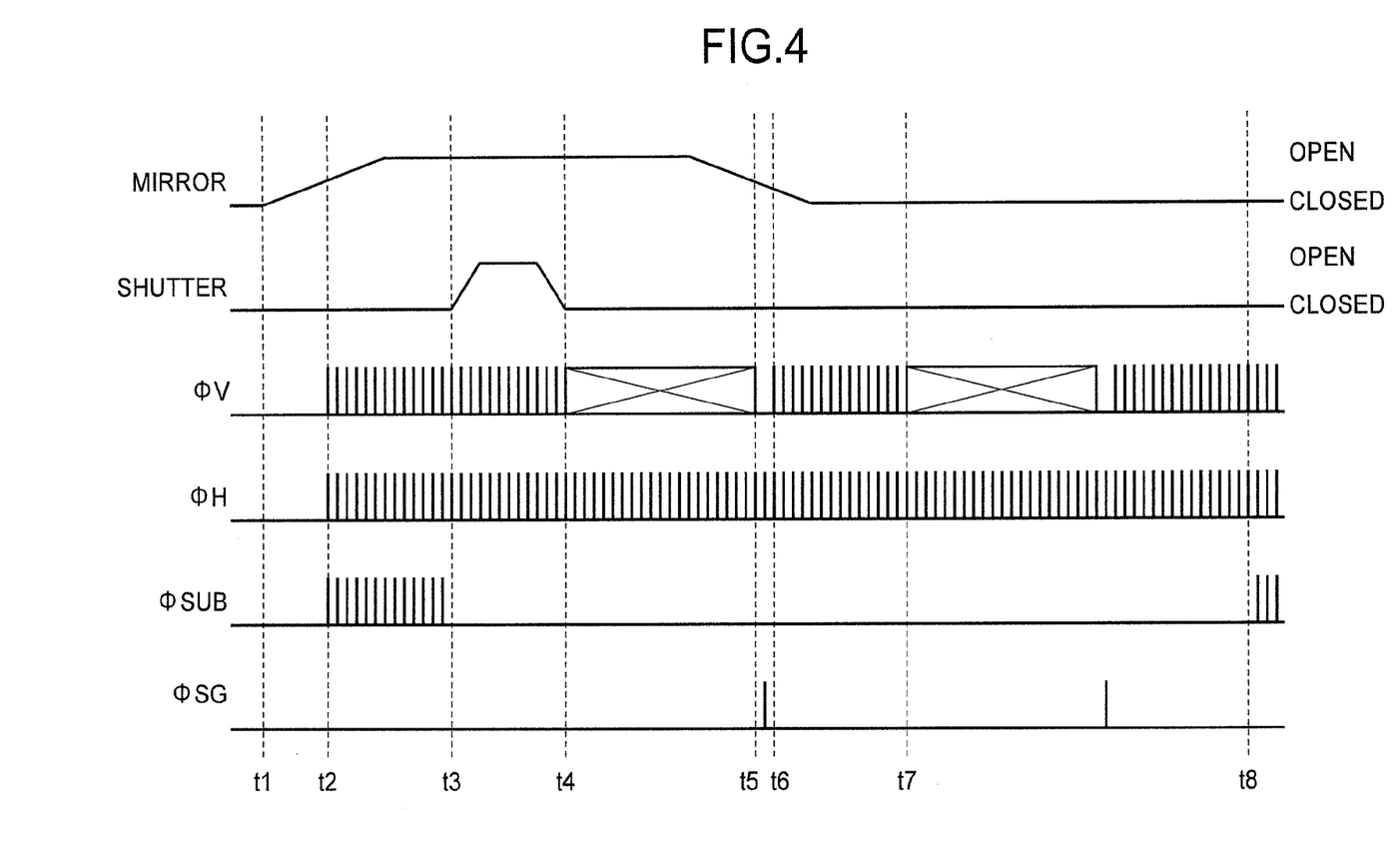
FIG. 4 is a timing chart illustrating the release operation.

Next, a release operation is explained using FIG. 4. The CPU 14 commences the release operation when full depression of the release button is detected.

At time t1 after detection of full depression of the release button, the mirror 17 is turned upward.

At time t2 following time t1, the input of ΦV of the first frequency, which is predetermined for transferring a signal charge, to the first to fourth vertical transfer terminals 35v1-35v4, the input of ΦH to the first and second horizontal transfer terminals 35h1 and 35h2, and the input of the ΦSUB to the electrical shutter terminal 35sub are commenced. Then, electrical charges remaining in the vertical CCDs 32, the horizontal CCD 33, and the pixels 31 are discharged.

At time t3, the input of the ΦSUB is suspended, and then all the pixels 31 become able to accumulate signal charges. In addition, at time t3, the shutter 18 is opened. Then, the exposure of an optical image to the imaging device 30 commences.

At time t4 after a set exposure time has passed since time t3, the shutter 18 is closed, and then the exposure is completed. In addition, at time t4, the frequency of the ΦV is adjusted to the second or third frequency. The second and third frequencies are predetermined for a speedy discharge and are greater than the first frequency. In addition, the third frequency is twice as great as the second frequency. By adjusting the frequency of ΦV to the second or third frequency, electrical charges remaining in the vertical CCDs 32 are speedily discharged.

The speedy discharge from the vertical CCDs 32 is completed when electrical charges remaining in locations of the vertical CCDs 32 facing all the first to fourth electrodes 35v1-35v4 are transferred twice to the horizontal CCD 33. As described above, the speed of transferring an electrical charge varies in proportion to the frequency of ΦV. Consequently, the period for speedy discharge from the vertical CCDs 32 is inversely proportional to the frequency of ΦV.

At time t5 when the speedy discharge is completed, ΦSG is input to the sensor gate terminal 35sg. By inputting ΦSG, signal charges generated and accumulated by all the pixels 31 during the period from time t3 to time t4 are read out to the vertical CCDs 32.

After inputting ΦSG, the frequency of ΦV is changed to the first frequency again. By changing the frequency of ΦV to the first frequency, signal charges can be transferred to the horizontal CCD 33 without transfer error.

The imaging device 30 is driven with an interlace scan. Namely, the output of all the signal charges from the imaging device 30 for a frame of image signal is separated twice. For example, after time t7 when all the signal charges in the odd rows have been transferred to the output amplifier 34, the transfer of signal charges in the even rows is begun. For the transfer of signal charges in the even rows, the speedy discharge from the vertical CCDs 32, the readout of signal charges from the pixels 31 to the vertical CCDs 32, and the transfer of the signal charges to the output amplifier 34 are carried out during the period from time t7 to time t8, as during the period from time t4 to time t7.

The speedy discharge from the vertical CCDs 32 as described above is explained in detail below. The single-lens reflex camera 10 has single and continuous photographing modes. In the single photographing mode, a single frame of an image signal is generated by full depression of the release button. On the other hand, in the continuous photographing mode, a subject is continuously photographed while the release button is being fully depressed, and a plurality of image signals is generated.

In the single photographing mode, ΦV of the second frequency is generated by the TG 12 for the speedy discharge from the vertical CCDs 32, and input to the first to fourth vertical transfer terminals 35v1-35v4.

On the other hand, in the continuous photographing mode, the frequency of TV for the speedy discharge is determined on the basis of the voltage of the battery. If the voltage of the battery is greater than the threshold, ΦV of the third frequency is generated by the TG 12 for the speedy discharge. On the other hand, if the voltage of the battery is less than the threshold, ΦV of the second frequency is generated by the TG 12 for the speedy discharge.

For the continuous photographing mode, it is generally desired that the number of image captures performable within a certain time be as large as possible. The number of image captures per time can be increased by shortening the period of the speedy discharge.

As described above, it is possible to shorten the period of the speedy discharge by raising the frequency of ΦV. However, power consumption will increase as the frequency is raised. Accordingly, if the power of the battery remains low, the photographing operation may be suspended. For completing the photographing operation, if the voltage of the battery is less than the threshold, the power consumption is reduced by speedy discharge according to ΦV of the lowered frequency.

Figure 5:
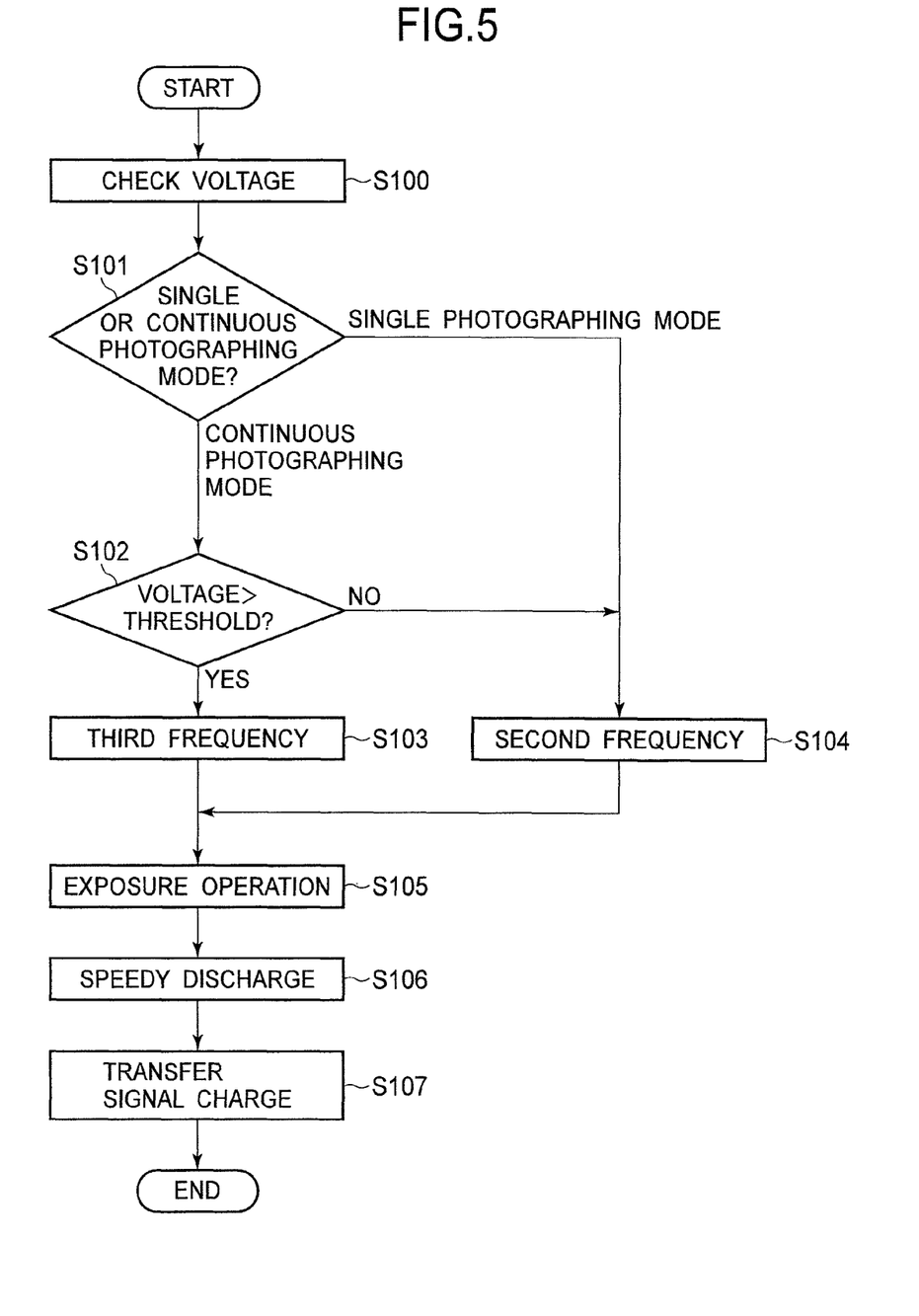
FIG. 5 is a flowchart illustrating the process for the release operation carried out by the CPU.

Next, the process for the release operation carried out by the CPU 14 is explained using the flowchart of FIG. 5. The processes for the release operation commences when the CPU 14 detects the full depression of the release button.

At step S100, the CPU 14 orders the battery checker 15 to detect the voltage of the battery. After checking the voltage, the process proceeds to step S101.

At step S101, the CPU 14 determines which of the single or continuous photographing modes has been selected. If the continuous photographing mode is selected, the process proceeds to step S102. On the other hand, if the single photographing mode is selected, the process proceeds to step S104.

At step S102, the CPU 14 determines whether or not the voltage detected at step S101 is greater than the threshold. If the voltage is greater than the threshold, the process proceeds to step S103. If the voltage is not greater than the threshold, the process proceeds to step S104.

At step S103, the CPU 14 orders the TG 12 to set the frequency of ΦV for the speedy discharge to the third frequency. On the other hand, at step S104, the CPU 14 orders the TG 12 to set the frequency of ΦV for the speedy discharge to the second frequency. After setting the frequency of ΦV for the speedy discharge, the process proceeds to step S105.

At step S105, the exposure of the light-receiving surface is begun. The CPU 14 orders the optical system driver 20 to turn the mirror 17 upward and to open the shutter 18 for the duration of the set exposure time. After the completion of the exposure, the process proceeds to step S106.

At step S106, the CPU 14 orders the TG 12 to carry out the speedy discharge from the vertical CCDs 32. In addition, the speedy discharge is carried out according to ΦV of the frequency set at step S103 or S104. After the completion of the speedy discharge, the process proceeds to step S107.

At step S107, the signal charges generated and accumulated by the pixels at step S105 are transferred to the output amplifier 34. As described above, the CPU controls the TG 12 so that the vertical CCDs 32 read out the signal charges, the vertical CCDs 32 transfer the signal charges to the horizontal CCD 33 according to ΦV of the first frequency, and the horizontal CCD 33 transfers the signal charges to the output amplifier 34. After the completion of the transfer of the signal charges to the output amplifier 34, the process for release operation terminates.

In the above embodiment, it is possible to change the speed of transferring the electrical charges remaining in the vertical CCDs 32 for the speedy discharge according to the power remaining in the battery. Consequently, it is possible to shorten the period for the speedy discharge while prioritizing the completion of the photographing operation.

The frequency of ΦV is changed according to the power remaining in the battery only when the single-lens reflex camera 10 is in the continuous photographing mode, in the above embodiment. However, the frequency can be changed when the single-lens reflex camera 10 is in the single photographing mode. Also for the single photographing mode, a user generally desires that the period from full depression of the release button to the completion of the photographing operation be short. So, the time taken to carry out the photographing operation can be shortened while prioritizing the completion of the photographing operation by changing the speed of electrical charge transfer according to the power remaining the battery.

The frequency of ΦV is changed according to the power remaining in the battery only when the photographing operation commences in the continuous photographing, in the above embodiment. However, the power remaining in the battery is detected and the frequency can be changed while the photographing operation is carried out.

The frequency changed according to the power remaining in the battery is for ΦV, in the above embodiment. However, the frequency changed according to the power is not limited to ΦV. In the above embodiment, it is the vertical CCDs 32 that read out the signal charges from the pixels 31. If the imaging device is manufactured so that the horizontal CCDs read out the signal charges from the pixels, the frequency of ΦH should be changed according to the remaining power. The same effect can be achieved with any kind of CCD image sensor by changing the frequency of the pulse used to directly read out signal charges from pixels, in consideration of the power remaining in the battery.

The third frequency is twice as great as the second frequency, in the above embodiment. However, the same effect can be achieved as long as the third frequency is greater than the second frequency.

The frequency of ΦV for the speedy discharge is selected from either of two predetermined frequencies (i.e., second and third frequencies), in the above embodiment. However, the frequency of ΦV can be selected from among any numbers of frequencies. The voltage of the battery is compared with a plurality of thresholds, and the frequency of ΦV can be adjusted on the basis of the comparison.

The threshold for comparison of the voltage is fixed, in the above embodiment. However, the threshold can be changed according to the kind of the battery. For example, lower and higher values are predetermined as thresholds for alkaline and lithium batteries, respectively. By changing the threshold according to the battery, the frequency of ΦV can be controlled adequately for the battery used.

Four electrodes 36a-36d are arranged for the vertical CCDs 32, in the above embodiment. However, the number of the electrodes for the vertical CCDs 32 is not limited to four. In addition, two electrodes are arranged for the horizontal CCD 33, in the above embodiment. However, the number of the electrodes for the horizontal CCD 33 is not limited to two.

The output of all the signal charges is separated two phases, according to interlace scan, in the above embodiment. However, the output of the signal charges could be separated into a different number of phases. In addition, all the signal charges can be output according to progressive scan instead.

The imaging device 30 is a CCD imaging device, in the above embodiment. However, other kinds of charge-transfer imaging device can be used.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 2008-236855 (filed on Sep. 16, 2008), which is expressly incorporated herein, by reference, in its entirety.

The invention claimed is:

1. An imaging-device driving unit, the imaging-device driving unit driving an imaging device, the imaging device having a plurality of pixels and a charge-transfer channel, the pixels generating signal charges according to amounts of received light, the charge-transfer channel reading out the signal charges from the pixels and transferring the signal charges at a speed according to a frequency of a channel-driving signal, the imaging device having a single photographing mode and a continuous photographing mode, the imaging-device driving unit comprising:
a signal generator that generates and transfers one of a normal transfer signal, a first discharge signal and a second discharge signal, to the imaging device, the normal transfer signal being the channel-driving signal with a frequency that is determined for transferring the signal charges, the first discharge signal being the channel-driving signal with a frequency that is determined for discharging an electrical charge remaining in the charge-transfer channel and greater than the frequency of the normal transfer signal, the second discharge signal being the channel-driving signal with a frequency that is determined for discharging an electrical charge remaining in the charge transfer channel and which is greater than the frequency of the first discharge signal;
a detector that detects a remaining power, the remaining power being the power remaining in a battery, the battery supplying the power to drive the imaging device; and
a controller that orders the signal generator to generate the first discharge signal when the imaging device is in the single photographing mode or when the imaging device is in the continuous photographing mode and the remaining power is less than a predetermined threshold, and orders the signal generator to generate the second discharge signal when the imaging device is in the continuous photographing mode and the remaining power is greater than the predetermined threshold.

2. An imaging-device driving unit according to claim 1, wherein the discharge of the electrical charge remaining in the charge-transfer channel is carried out before the charge-transfer channel reads out the signal charges generated by the pixels.

3. An imaging-device driving unit according to claim 1, wherein the charge-transfer channel is a CCD.

4. The imaging device driving unit according to claim 1, wherein the frequency of the first discharge signal is twice as large as the frequency of the second discharge signal.

5. The imaging device driving unit according to claim 1, wherein the controller orders the signal generator to generate one of said first and second discharge signals only when the imaging device starts a photographing operation in the continuous photographing mode.

6. The imaging device driving unit according to claim 1, the predetermined threshold comprising one of a plurality of thresholds selected in accordance with a type of battery.

7. An imaging apparatus comprising:
an imaging device that has a plurality of pixels and a charge-transfer channel, the pixels generating signal charges according to amounts of received light, the charge-transfer channel reading out the signal charges from the pixels and transferring the signal charges at a speed according to a frequency of a channel-driving signal, the imaging device having a single photographing mode and a continuous photographing mode;
a signal generator that generates and transfers one of a normal transfer signal, a first discharge signal and a second discharge signal to the imaging device, the normal transfer signal being one of the channel-driving signal with a frequency that is determined for transferring the signal charges, the first discharge signal being one of the channel-driving signal with a frequency that is determined for discharging an electrical charge remaining in the charge-transfer channel and greater than the frequency of the normal transfer signal, the second discharge signal being one of the channel-driving signal with a frequency that is determined for discharging an electrical charge remaining in the charger transfer channel and having a frequency that is greater than the frequency of the first discharge signal;

a detector that detects a remaining power, the remaining power being the power remaining in a battery, the battery supplies the power to drive the imaging device; and a controller that orders the signal generator to generate the first discharge signal when the imaging device is in the single photographing mode or when the imaging device is in the continuous photographing mode and the remaining power is less than a predetermined threshold, and orders the signal generator to generate the second discharge signal when the imaging device is in the continuous photographing mode and the remaining power is greater than the predetermined threshold.

8. The imaging apparatus according to claim 7, wherein the frequency of the first discharge signal is twice as large as the frequency of the second discharge signal.

9. The imaging apparatus according to claim 7, wherein the controller orders the signal generator to generate one of said first and second discharge signals only when the imaging device starts a photographing operation in the continuous photographing mode.

10. The imaging apparatus according to claim 7, the predetermined threshold comprising one of a plurality of thresholds selected in accordance with a type of battery.

11. The imaging apparatus according to claim 7, wherein the discharge of the electrical charge remaining in the charge transfer channel is carried out before the charge transfer channel reads out the signal charges generated by the pixels.

12. The imaging apparatus according to claim 7, wherein the charge transfer channel is a CCD.

* * * * *